Figure 1:
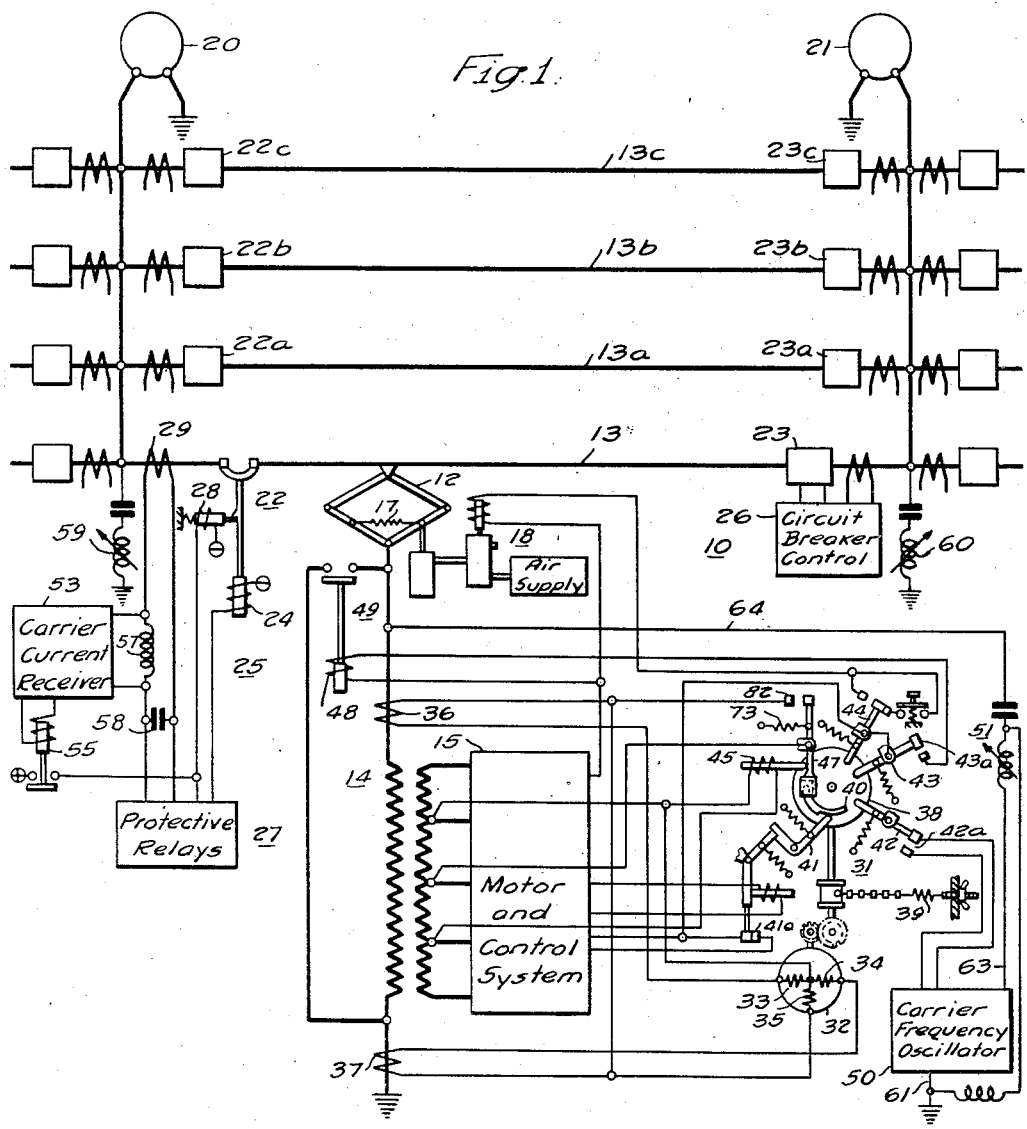

Nov. 16, 1948.   E. L. HARDER   2,454,164
CONTROL SYSTEM
Filed Aug. 2, 1945

WITNESSES:

INVENTOR
Edwin L. Harder.
BY
ATTORNEY

Patented Nov. 16, 1948

2,454,164

UNITED STATES PATENT OFFICE 2,454,164

CONTROL SYSTEM

Edwin L. Harder, Edgewood, Pa., assignor to Westinghouse Electric Corporation, East Pittsburgh, Pa., a corporation of Pennsylvania Application August 2, 1945, Serial No. 608,579

6 Claims. (Cl. 191—8)

My invention relates generally to control systems, and it has reference in particular to remote high frequency operated control systems for trolley conductor systems.

Owing to the limited space available, and to weight limitations, locomotives and multiple unit cars are frequently not provided with a power circuit breaker for protecting the electrical apparatus thereon. In the case of an electrical fault in the apparatus on the vehicle, which does not itself cause sufficient current to flow in the trolley conductor to open the feeder circuit breakers, a ground switch is usually closed which connects the trolley conductor to ground, and produces a current in the trolley conductor which effects operation of protective relays at a feeder substation to open the substation breaker, thereby clearing the fault. While this arrangement is comparatively simple, it has the objection that though the fault may not itself be very severe, the resulting currents produced by closing the grounding switch, when the vehicle is relatively close to a feeder substation, may amount to as much as 65,000 amperes, and cause considerable burning and damage to both the pantograph and trolley conductor. Accordingly, it is desirable to provide for remote operation of the feeder substation breakers from the vehicle without drawing excessively high currents.

Generally stated, it is an object of my invention to provide a remote high frequency operated control system for trolley conductor circuit breakers, which is simple and inexpensive to manufacture and is easy to install and operate.

More specifically, it is an object of my invention to provide for remotely tripping a trolley conductor circuit breaker at a substation by means of a carrier frequency signal upon the occurrence of a fault in apparatus on an electrically operated vehicle.

Another object of my invention is to provide for selectively tripping circuit breakers on one trolley conductor of a plurality which are connected in parallel, when a fault occurs on a vehicle which is energized from said one trolley conductor.

Yet another object of my invention is to provide for tripping a trolley conductor circuit breaker when a fault occurs on an electrically operated vehicle, without drawing excessive fault currents which may burn the trolley conductor and the pantograph.

It is also an object of my invention to provide for selectively tripping a trolley conductor circuit breaker when a fault occurs on an electrically operated vehicle which is within a predetermined distance of the circuit breaker.

Other objects will in part be obvious, and will in part be explained hereinafter.

In practicing my invention, a carrier frequency generator connected between the trolley conductor and ground provides a carrier frequency signal for tripping the trolley conductor circuit breaker in response to operation of a fault responsive device on a locomotive which sequentially disconnects the motor, renders the carrier frequency generator effective to produce a signal, and then lowers the pantograph. At each of the trolley conductor feeder substations, a carrier receiver is provided for each circuit breaker, for receiving the carrier frequency signal and tripping the breaker, and is coupled to the conductor either through the current transformer which is used for operating the usual protective relays or through a special carrier frequency transformer provided for the purpose. A circuit having low impedance to ground at carrier frequency is provided at each station for connecting the trolley conductors to ground to provide a return path for a carrier frequency signal transmitted from a locomotive.

For a more complete understanding of the nature and scope of my invention, reference may be made to the following detailed description which may be studied in connection with the accompanying drawing in which:

Figure 1 is a diagrammatic view of a protective control system embodying the invention in one of its forms.

Referring to Figure 1, the reference numeral 10 may denote generally the electrical power and control equipment of an electrically operated vehicle which is disposed to be energized through a pantograph collecter 12 which engages a trolley conductor 13.

The electrical equipment 10 may comprise a power transformer 14 connected to the pantograph 12 for supplying electrical energy for the operation of the vehicle to a motor and control system 15. The pantograph 12 may be of the spring-raised air-lowered type being, for example, provided with a spring 17 for raising the pantograph to its operating position, and air operated lowering means 18 for lowering the pantograph to disconnect it from the trolley conductor 13.

The trolley conductor 13 may be one of a number of conductors including, for example, conductors 13a, 13b, and 13c disposed to be connected to sources of electrical energy 20 and 21 in parallel circuit relation. The trolley conductors 13, 13a, 13b and 13c may be provided with circuit breakers 22, 22a, 22b, 22c and 23, 23a, 23b, and 23c for disconnecting them from the sources 20 and 21, respectively. Each of the trolley conductors may be provided with circuit breakers connecting them to the different sources, but since the arrangement is similar in each instance, both for each conductor and for both ends of each conductor, it will be described in detail only for the end of trolley conductor 13 which is adjacent the source 20. The circuit breaker 22 may, for example, be provided with an operating winding 24 disposed to be energized through circuit breaker control apparatus 25 including the usual operating and protective relays designated generally by the numeral 27, in a manner well known in the art. Trip means 28 may be provided for opening the circuit breaker 22 to disconnect the trolley conductor 13 from the source 20. A current transformer 29 may be provided for energizing the operating and protective relays 27. This transformer is preferably of a suitable type that provides substantially negligible impedance both to relatively low power frequencies as well as to carrier frequencies on the order of about 10,000 cycles per second.

In order to provide for protecting the control equipment on the vehicle, means such as the protective control relay 31 may be provided. The relay 31 may be of the type described in detail in Patent No. 2,106,844 which issued on February 1, 1938, to E. L. Harder et al. The protective relay 31 may, for example, comprise a motor element 32 having operating windings 33 and 34 energized from current transformers 36 and 37 on the pantograph and ground sides of the power transformer 14 respectively, for effecting operation of the relay upon excessive fault currents through the primary winding of the transformer. A differential winding 35 may be provided, which may be connected between the current transformer 36 and 37, so as to be responsive to a current differential in the case of an internal fault in the power transformer.

The contact element of the protective relay 31 may comprise a contact plate 38, which may be operated by motor 32 against the force of a retracting spring 39. The plate 38 may be provided with an operating cam 40 for actuating in sequence a plurality of arms 41, 42, 43 and 44. Means such as the latch winding 45 may be provided for normally retaining a latch 47 in interfering relation with the cam member 40 to maintain the relay in operating relation so long as the transformer 14 is energized. Whenever a fault current occurs, the motor element 32 operates to move the contact plate 38 in a counterclockwise direction so as to release the latch arm 41 after a time delay, which is sufficient to permit the trolley conductor circuit breakers to have cleared the fault if it is such as to effect operation of the breakers directly. This results in the opening of contact members 41a, which interrupts the energizing circuit for the main control switch of the motor and control system 15 to affect disconnection of the vehicle motors from the transformer 14. If this removes the fault condition, the contact plate 38 returns to its normal position. The arm 41 may be reset through suitable circuits in the motor and control system 15.

Contact arm 43 of the relay 31 may be used to energize the operating winding 48 of a grounding switch 49 provided for connecting the current collector 12 to ground. The arm 44 may be used to effect operation of the pantograph lowering means 18 when the contact plate 38 is retracted by the spring 39 after power is removed from the pantograph.

If disconnecting the motors does not remove the fault, the motor element 32 continues to operate the plate 38. In order to provide for deenergizing the trolley conductor 13 to protect the electrical equipment on the vehicle, before the grounding switch 49 is operated, the contact arm 42 may be used to effect remote control of the trolley circuit breakers. For example, means such as a carrier frequency oscillator or generator 50, which may be disposed to provide a signal frequency on the order of about 10,000 cycles per second, may be provided on the vehicle for producing a breaker controlling signal. The generator 50 may be connected between the pantograph 12 and ground through a coupling circuit 51 and controlled by the control relay 31. For example, contact members 42a of contact arm 42 of the protective relay 31 may be used to key the generator 50 after a time delay sufficient for the trolley conductor circuit breakers to have opened if the fault current had been large enough, or for the fault to have been cleared by the motor switches if it were beyond them.

At the substation, means such as the carrier frequency receiver 53 may be provided in connection with the circuit breaker 22 for operating a control relay 55 to effect energization of the trip means 28 for opening the breaker. The carrier receiver 53 may be coupled to the trolley conductor 13 either by a separate transformer or through the current transformer 29, by means of a series coupling circuit comprising an inductance device 57 and a shunting condenser 58, so as to be responsive to a carrier frequency signal transmitted by the generator 50. The current transformer provides a coupling device which has an almost negligible impedance, both to the power current and also to the carrier frequency current. A tuned or high pass filter circuit 59 having low impedance at the carrier frequency may be provided at each of the substations for effectively grounding the trolley conductors to provide a return path for the relatively high frequency carrier signal, while blocking the flow of the relatively low frequency power currents. The carrier frequency generator and receivers may be so arranged that the feeder breakers will be opened by this means only if the fault occurs when the vehicle is within 2 to 3 miles of a substation, in which instance the closing of the grounding switch might cause an excessive current in the trolley.

Whenever a fault occurs in the electrical equipment on the vehicle which draws an abnormal current from the conductor 13, one or both of the feeder breakers will trip due to this current before the protective relay 31 operates. In the event, however, that the actual fault current is not large enough to trip the feeder breakers, the relay 31 operates after a time delay to first disconnect the vehicle motors from the power transformer by operating contact arm 41.

If the fault condition is not removed by this operation, the motor element 32 of the protective relay 31 continues to rotate the contact plate 38, and the contact arm 42 is actuated, closing contact members 42a. The carrier frequency generator 50 is thereby energized. A circuit is provided for the carrier frequency signal from ground through conductor 61, and generator 50, conductor 63, filter circuit 51, conductor 64, pantograph 12, conductor 13, and carrier frequency circuit 59 to ground. A carrier frequency voltage accordingly appears across the inductance device 57. If the vehicle is sufficiently close to the circuit breaker 22, for example, within two to three miles, so that the curernt which would be produced by closing the grounding switch 49 would be excessive, the voltage across the inductance device 57 will be high enough to effect operation of the control relay 55 which operates the trip means 28 to open circuit breaker 22.

When the circuit breaker 22 opens, it removes the relatively low impedance shunt presented to the carrier signal by the filter circuit 59. Accordingly, even though the signal may be initially only strong enough to open the circuit breaker 22 which is within two to three miles of the vehicle, the control equipment associated with the circuit breaker 23 may be operated to open the breaker 23 as soon as the circuit breaker 22 opens, since upon removal of the low impedance carrier ground connection of the trolley conductor 13, a much stronger carrier signal may be received at the breaker 23 through the filter circuit 60. The pantograph 12 is lowered after the conductor 13 is deenergized by operation of the relay 31 under the action of the spring 39.

In the event that a fault occurs on the vehicle when it is more than two or three miles from any substation, the conductor current produced by closing the grounding switch would in all probability not be high enough to damage the conductor or pantograph. Accordingly, the signal voltage produced by the generator 50 may be selected so that it will not trip the circuit breaker when the vehicle is more than two to three miles from the nearest circuit breaker, and the motor element 32 may continue to operate until the contact arm 43 is actuated whereby the grounding switch 49 will be energized. When the pantograph 12 is grounded, while at least 2 or 3 miles from a substation, the artificial fault current thus produced will be sufficient to open the circuit breakers 22 and 23 through the normal protective relays associated with the circuit breakers, without producing the burning and damage which might be caused in the pantograph closer to the substation.

In the above described system, a comparatively low carrier frequency should be used, so that proper operation through the current transformer used for operating the usual protective relays may be obtained, and so that capacity coupling between the different trolley conductors will not result in carrier signals in the other trolleys of a value approaching that in the particular trolley conductor whose circuit breaker is to be tripped. The carrier frequency should further be so selected that the locomotive itself will not short the carrier signal. Indeed, this invention is intended to be primarily operated for relatively light faults on a locomotive which would not normally short-circuit the carrier signal. Fault currents in excess of 3,000–6,000 amperes would normally operate the substation circuit breakers through the normal protective relays without waiting for the carrier signal. With a carrier frequency of 10,000 cycles, the wave length is on the order of 18 miles, while operation in general is only required within a mile or two of a substation. If the locomotive is more than two to three miles from the nearest substation, the artificial fault current produced by closing the ground switch would not be too severe, and the carrier signal need not be effective at a greater distance than that from the nearest substation, since the grounding switch may be used to clear the fault.

From the above description and accompanying drawing, it will be apparent that I have provided a protective control system for electrically operated vehicles which is simple and inexpensive to manufacture and is easy to install and maintain. Operation of the substation circuit breakers may be effected selectively when the vehicle is within such a distance from a circuit breaker that operation of the usual grounding switch would result in excessively heavy currents which might burn the trolley conductor or pantograph. When the vehicle is more than two to three miles from the station, the fault may be cleared by the grounding switch without damage, and relatively heavy faults are cleared in the first instance by the circuit breaker fault current relays directly.

Since certain changes may be made in the above-described construction and different embodiments of the invention may be made without departing from the spirit or scope thereof, it is intended that all the matter contained in the above description and shown in the accompanying drawing shall be considered as illustrative and not in a limiting sense.

I claim as my invention:

1. In a control system for electrical apparatus on an electrically operated vehicle having a current collector for engaging a trolley conductor which is disposed to be connected to a source of electrical energy through a circuit breaker, tuned circuit means connected on the source side of the circuit breaker to provide a high frequency ground connection connecting the trolley conductor at substantially ground potential for a high frequency signal, control circuit means responsive to a fault condition on the vehicle to produce a high frequency signal on the order of 10,000 cycles per second, and circuit means associated with the circuit breaker including control means coupled to the trolley conductor by a low impedance current transformer, said control means being responsive to said high frequency signal to open the circuit breaker.

2. In a protective control system for electrical apparatus on an electrically operated vehicle having a current collector for engaging one of a plurality of serially related sections of trolley conductor having circuit breakers adjacent the ends of each section connecting adjacent ends of the conductors to common buses, tuned circuit means connecting each common bus at substantially ground potential for a high frequency signal of about 10,000 cycles per second, a high frequency receiver for receiving said signal associated with each circuit breaker coupled by means of low impedance series coupling means to the conductor section associated therewith intermediate the conductor section and the common bus adjacent said circuit breaker, said receiver being responsive to a high frequency signal to open its associated circuit breaker, and control means on the vehicle responsive to a fault current on the vehicle to produce a high frequency signal of about 10,000 cycles per second, whereby only the circuit breakers connecting the conductor section to the common buses at each end are opened.

3. A protective system for electrical apparatus on an electrically operated vehicle having a current collector disposed to engage one of a plurality of parallel trolley conductor sections energized from common buses through circuit breakers adjacent opposite ends of the sections, a carrier frequency receiver associated with each circuit breaker and series coupled by low impedance coupling means to the conductor associated therewith intermediate the circuit breaker and the associated bus operable to trip the breaker in response to a carrier frequency signal, a carrier frequency generator on the vehicle having an operating frequency of about 10,000 cycles per second, relay means on the vehicle responsive to a predetermined fault condition on the vehicle to produce a carrier frequency signal, and tuned circuit means connecting each of the common buses at substantially ground potential for the carrier frequency signal, whereby the carrier frequency signal is substantially limited to the conductor section engaged by the current collector.

4. A protective control system for apparatus on a vehicle having a current collector engaging a trolley conductor having a plurality of serially related sections comprising, circuit breakers connecting adjacent ends of adjacent sections of the conductor to common buses connected to sources of relatively low frequency electrical energy, trip means for each circuit breaker including a current transformer connected in circuit with an associated section of the conductor intermediate the circuit breaker and an adjacent common bus, said current transformer having substantially negligible impedance at both said low frequency and at a carrier frequency of about 10,000 cycles per second, a filter circuit providing a low impedance ground for a carrier frequency of about 10,000 cycles per second connected intermediate the circuit breakers at each circuit breaker location to maintain the ends of each conductor section at ground potential for the carrier frequency, means including a carrier frequency receiver coupled with each current transformer for operating the trip means in response to a carrier frequency signal current of about 10,000 cycles per second and of predetermined strength, a carrier frequency generator on the vehicle having an operating frequency of about 10,000 cycles per second, and means including a filter circuit and control means responsive to a fault condition on the vehicle for transmitting a carrier frequency signal of said frequency to the current collector, whereby said signal effects operation only of the trip means of the circuit breakers connecting the engaged conductor section to the common buses at each end to trip said circuit breakers only.

5. In a protective relay system for apparatus on an electrically operated vehicle having a pantograph collector for connecting said apparatus to a trolley conductor, control means operable to disconnect the conductor from a source of electrical energy including a circuit breaker and trip means, carrier receiver means series-coupled to the conductor through a current transformer having a negligible impedance and operable to effect operation of the trip means in response to a carrier frequency signal of about 10,000 cycles per second, signal means on the vehicle operable to produce a carrier frequency signal of said frequency, protective means on the vehicle responsive to an abnormal current condition in said apparatus for effecting connection of said carrier frequency signal means to the conductor, and tuned circuit means connecting the trolley conductor at substantially ground potential for the carrier frequency signal intermediate the carrier receiver coupling and the source.

6. In a protective relay system for apparatus on a vehicle, a current collector for connecting the apparatus to one of a plurality of parallel sections of a trolley conductor, a pair of circuit breakers, one adjacent each end of each of the sections connecting the sections of the conductor to common sources of relatively low frequency electrical energy, trip means for opening each of the breakers, means including a current transformer having a substantially negligible impedance coupled to each section of the trolley conductor adjacent each end thereof and connected to operate the trip means of the associated circuit breaker in response to a predetermined current in said section of the trolley conductor, means including a carrier frequency receiver associated with each breaker and connected to the conductor through said current transformer for operating the trip means of said breaker, means including an inductance device and a by-pass capacitor connected in circuit relation between each current transformer and its associated carrier receiver, a tuned filter circuit at each location connected intermediate the circuit breakers and providing a low impedance ground for a carrier frequency signal on the order of 10,000 cycles per second, a carrier frequency generator on the vehicle having a frequency on the order of 10,000 cycles per second, and relay means on the vehicle responsive to an abnormal current of less value than required to operate the trip means directly, said relay means being operable to connect the carrier frequency generator to produce a carrier frequency voltage between the conductor and ground in said section only for effecting operation of the trip means of the circuit breakers in said one section only.

EDWIN L. HARDER.

REFERENCES CITED

The following references are of record in the file of this patent:

UNITED STATES PATENTS

| Number | Name | Date |
|--------|------|------|
| 1,798,690 | Ludwig | Mar. 31, 1931 |
| 1,817,692 | Kloss et al. | Aug. 4, 1931 |
| 1,831,338 | Brown | Nov. 10, 1931 |
| 1,831,636 | Peters | Nov. 10, 1931 |
| 1,840,087 | Fitzgerald | Jan. 5, 1932 |
| 2,106,844 | Harder et al. | Feb. 1, 1938 |